US012257856B2

(12) United States Patent
Ito et al.

(10) Patent No.: US 12,257,856 B2
(45) Date of Patent: Mar. 25, 2025

(54) SEAL-TYPE THERMAL TRANSFER IMAGE-RECEIVING SHEET

(71) Applicant: Dai Nippon Printing Co., Ltd., Tokyo (JP)

(72) Inventors: Hideo Ito, Tokyo (JP); Masayuki Tani, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 43 days.

(21) Appl. No.: 18/449,049

(22) Filed: Aug. 14, 2023

(65) Prior Publication Data

US 2023/0382146 A1 Nov. 30, 2023

Related U.S. Application Data

(63) Continuation of application No. 16/979,359, filed as application No. PCT/JP2019/013206 on Mar. 27, 2019, now Pat. No. 11,772,403.

(30) Foreign Application Priority Data

Mar. 30, 2018 (JP) ................ 2018-069900

(51) Int. Cl.
  *B41M 5/41* (2006.01)
  *B41M 5/42* (2006.01)
  *B41M 5/52* (2006.01)

(52) U.S. Cl.
  CPC ............... *B41M 5/41* (2013.01); *B41M 5/42* (2013.01); *B41M 5/52* (2013.01);
  (Continued)

(58) Field of Classification Search
  CPC . B41M 5/41; B41M 5/42; B41M 5/52; B41M 5/5254; B41M 2205/02; B41M 2205/32; B41M 2205/38
  See application file for complete search history.

(56) References Cited

U.S. PATENT DOCUMENTS

| 6,153,558 A | 11/2000 | Shirai et al. |
| 2008/0009412 A1 | 1/2008 | Funada et al. |

(Continued)

FOREIGN PATENT DOCUMENTS

| JP | H11-080680 A1 | 3/1999 |
| JP | 2017-136784 A1 | 8/2017 |

OTHER PUBLICATIONS

International Search Report and Written Opinion (Application No. PCT/JP2019/013206) dated Jun. 18, 2019.

*Primary Examiner* — Gerard Higgins
(74) *Attorney, Agent, or Firm* — BURR PATENT LAW, PLLC

(57) ABSTRACT

In a seal-type thermal transfer image-receiving sheet, the total thickness thereof is 250 μm or less, a seal portion has a layered structure in which a pressure-adhesive layer, a seal portion substrate, and a receiving layer are layered in this order from a release portion side. A release portion has a layered structure in which a surface resin layer, a release portion paper substrate, and a back face resin layer are layered in this order from a seal portion side. One or both of the seal portion substrate and the surface resin layer includes a layer made of polyethylene terephthalate is 50 μm or more. The sum of the thickness of the seal portion substrate and the thickness of the surface resin layer is four times or more the thickness of the back face resin layer, and the thickness of the back face resin layer is 20 μm or more.

1 Claim, 1 Drawing Sheet

(52) U.S. Cl.
CPC ..... *B41M 2205/02* (2013.01); *B41M 2205/32* (2013.01); *B41M 2205/38* (2013.01)

(56) References Cited

U.S. PATENT DOCUMENTS

2009/0015649 A1* 1/2009 Keeton ................. B41J 2/32
                                                                            347/217
2017/0230527 A1    8/2017 Wasamoto et al.

* cited by examiner

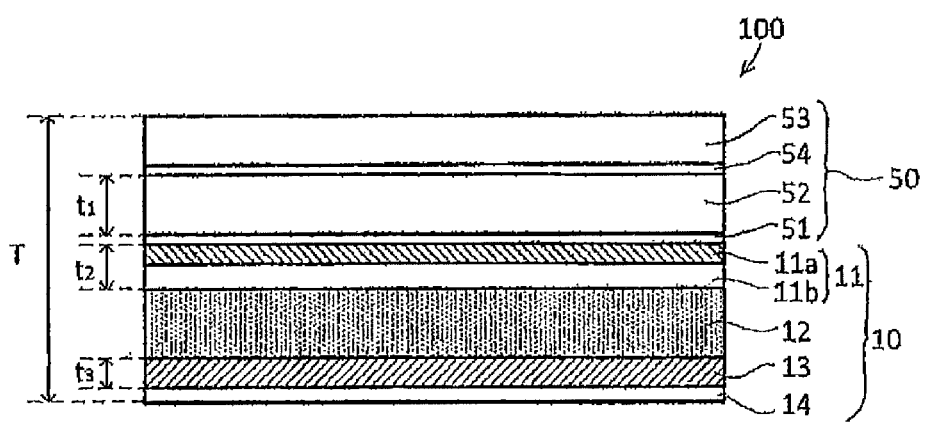

SEAL-TYPE THERMAL TRANSFER IMAGE-RECEIVING SHEET

TECHNICAL FIELD

The present invention relates to a seal-type thermal transfer image-receiving sheet.

BACKGROUND ART

Various thermal transfer methods have been suggested for production of prints. Among these, sublimation type thermal transfer methods have been widely used to form a thermal transferred image on a transfer receiving article. For forming a thermal transferred image by the sublimation type thermal transfer method, there is used a thermal transfer sheet having a dye layer provided on one surface of a substrate and a transfer receiving article, for example, a thermal transfer image-receiving sheet having a receiving layer provided on one surface of another substrate. Then, the receiving layer of the thermal transfer image-receiving sheet and the dye layer of the thermal transfer sheet are superposed together, and heat is applied by a thermal head from the back side of the thermal transfer sheet to allow the dye in the dye layer to migrate onto the receiving layer. Thereby a print in which a thermal transferred image is formed on the receiving layer can be obtained. According to the sublimation type thermal transfer method, the amount of the dye to migrate can be controlled by the amount of energy to be applied to the thermal transfer sheet. Thus, this method can form a high quality print that has a very vivid image, has excellent transparency, color reproducibility and gradient of halftones, and is comparable to a full-color photographic image.

A thermal transfer image-receiving sheet to be used for such a thermal transfer method includes a so-called seal-type thermal transfer image-receiving sheet, in which a seal portion and a release portion are integrated, and the seal portion is provided peelably from the release portion, as disclosed in Patent Literature 1.

CITATION LIST

Patent Literature

Patent Literature 1: Japanese Patent Laid-Open No. 2017-136784

SUMMARY OF INVENTION

Technical Problem

Since such a seal-type thermal transfer image-receiving sheet has a structure in which a plurality of layers of different materials are layered, printing failure, cutting failure, further, conveyance failure and the like may occur inside a printer. Thus, the seal-type thermal transfer image-receiving sheet has room for improvement.

It is a principal object of the present invention to provide a seal-type thermal transfer image-receiving sheet capable of preventing printing failure, cutting failure, and further conveyance failure.

Solution to Problem

A seal-type thermal transfer image-receiving sheet according to an embodiment of the present disclosure for solving the above problems is a seal-type thermal transfer image-receiving sheet including a seal portion provided peelably from a release portion, wherein the seal-type thermal transfer image-receiving sheet has a total thickness of 250 μm or less, the seal portion has a layered structure in which a pressure-adhesive layer, a seal portion substrate, and a receiving layer are layered in this order from the release portion side, the release portion has a layered structure in which a surface resin layer, a release portion paper substrate, and a back face resin layer are layered in this order from the seal portion side, either one or both of the seal portion substrate and the surface resin layer includes a layer made of polyethylene terephthalate, the total thickness of all the layers made of polyethylene terephthalate included in the seal portion substrate and the surface resin layer is 50 μm or more, the sum of the thickness of the seal portion substrate and the thickness of the surface resin layer is four times or more the thickness of the back face resin layer, and the thickness of the back face resin layer is 20 μm or more.

In the seal-type thermal transfer sheet, the surface resin layer may include a first surface resin layer made at least of polyethylene terephthalate or polypropylene.

In the seal-type thermal transfer image-receiving sheet, the surface resin layer may have a layered structure including the first surface resin layer, and the first surface resin layer may be located on the seal portion side.

The first resin layer may also be of polyethylene terephthalate.

The surface resin layer may also have a layered structure including the first surface resin layer and the second surface resin layer, and the second surface resin layer may also be of polyolefin.

The seal portion substrate may also be of a resin having voids inside.

The seal portion may also have a release layer instead of the pressure-adhesive layer.

Advantageous Effects of Invention

According to the seal-type thermal transfer image-receiving sheet according to an embodiment of the present disclosure, it is possible to prevent printing failure, cutting failure, and further conveyance failure.

BRIEF DESCRIPTION OF DRAWINGS

FIG. 1 is a schematic sectional view illustrating an exemplary seal-type thermal transfer image-receiving sheet according to one embodiment of the present invention.

DESCRIPTION OF EMBODIMENTS

Hereinafter, an embodiment of the present invention will be described with reference to the drawing and the like. The present invention may be embodied in different aspects and should not be construed as being limited to the description of the exemplary embodiment below. In the drawing, a component may be shown schematically regarding the width, thickness, and the like, instead of being shown in accordance with the actual form, for the sake of clearer illustration. The schematic drawing is merely an example and does not limit the interpretations of the present invention in any way. In the specification and the drawing, a component that has substantially the same functions as those described before with reference to a previous drawing bears the identical reference signs thereto, and detailed descriptions thereof may be omitted as appropriate.

Seal-Type Thermal Transfer Image-Receiving Sheet

FIG. 1 is a schematic sectional view of a seal-type thermal transfer image-receiving sheet 100 according to an embodiment of the present disclosure.

As shown in FIG. 1, in the seal-type thermal transfer image-receiving sheet 100 according to the embodiment of the present disclosure, a seal portion 50 and a release portion 10 are integrated, and the seal portion 50 is provided peelably from the release portion 10.

The seal portion 50 constituting the seal-type thermal transfer image-receiving sheet 100 has a layered structure in which a pressure-adhesive layer 51, a seal portion substrate 52, and a receiving layer 53 are layered in this order from the release portion 10 side. In the seal-type thermal transfer image-receiving sheet 100 shown, an adhesive layer 54 is provided between the seal portion substrate 52 and the receiving layer 53.

Meanwhile, the release portion 10 constituting the seal-type thermal transfer image-receiving sheet 100 has a layered structure in which a surface resin layer 11, a release portion paper substrate 12, and a back face resin layer 13 are layered in this order from the seal portion 50 side. In the seal-type thermal transfer image-receiving sheet shown, the surface resin layer 11 includes a first surface resin layer 11a made of polyethylene terephthalate or polypropylene. Additionally, the surface resin layer 11 has a layered structure in which the first surface resin layer 11a and a second surface resin layer 11b are layered, and a back face layer 14 is provided under the back face resin layer 13.

Such a seal-type thermal transfer image-receiving sheet 100 according to the present embodiment is characterized in that either or both of the seal portion substrate 52 and the surface resin layer 11 include a layer made of polyethylene terephthalate and that the total thickness of all the layers made of polyethylene terephthalate included in the seal portion substrate 52 and the surface resin layer 11 is 50 μm or more. It is possible to prevent cutting failure with the cutter in a printer or cutting failure in cutting with scissors by setting the total thickness of the layers made of polyethylene terephthalate located above (on the seal portion side of) the release portion paper substrate 12 in the seal-type thermal transfer image-receiving sheet 100 to 50 μm or more.

The seal-type thermal transfer image-receiving sheet 100 according to the present embodiment is also characterized in that the total thickness T is 250 μm or less. It is possible to prevent cutting failure with the cutter in a printer or cutting failure in cutting with scissors by the fact that the total thickness T is 250 μm or less. The total thickness T is particularly preferably 235 μm or less.

The seal-type thermal transfer image-receiving sheet 100 according to the present embodiment is also characterized in that the total thickness $(t_1+t_2)$ of the thickness of the seal portion substrate 52 $t_1$ and the thickness of the surface resin layer 11 $t_2$ is four times or more the thickness of the back face resin layer 13 $t_3$, that is, $(t_1+t_2)/t_3 \geq 4$ is satisfied. It is possible to prevent the seal-type thermal transfer image-receiving sheet 100 from curling in a manner in which the side on the receiving layer 53 bulges, from having a marked degree of so-called convex curling and to prevent printing failure due to the convex curl by balancing the thickness of each of the seal portion substrate 52 constituting the seal portion 50 and the surface resin layer 11 and the back face resin layer 13 constituting the release portion 10 as described above.

The seal-type thermal transfer image-receiving sheet 100 according to the present embodiment is further characterized in that the thickness of the back face resin layer 13 $t_3$ is 20 μm or more. It is possible to prevent conveyance failure of the seal-type thermal transfer image-receiving sheet 100 in a printer by setting the thickness of the back face resin layer 13 $t_3$ to 20 μm or more.

Each constituent of the seal-type thermal transfer image-receiving sheet 100 according to the present embodiment having the characteristics and acting effects described above will be described in detail hereinafter.

Release Portion Paper Substrate

A material for the release portion paper substrate 12 constituting the release portion 10 of the seal-type thermal transfer image-receiving sheet 100 according to the present embodiment is not particularly limited, and various paper materials conventionally used can be selected appropriately and used. Specific examples thereof include wood-free paper, coated paper, resin coated paper, kraft paper, Japanese paper, art paper, cast coated paper, cardboard, emulsion-impregnated paper, synthetic rubber latex-impregnated paper, synthetic resin-filled paper, and cellulose fiber paper.

There is also no particular limitation with respect to the thickness of the release portion paper substrate 12. The thickness should be designed in consideration of the balance with other layers such that the total thickness of the seal-type thermal transfer image-receiving sheet 100 is 250 μm or less. For example, the thickness may be about 50 μm or more and about 125 μm or less.

Surface Resin Layer of Release Portion

The surface resin layer 11 constituting the release portion 10 of the seal-type thermal transfer image-receiving sheet 100 according to the present embodiment is located, as shown in FIG. 1, on the surface of the release portion paper substrate 12 on the seal portion 50 side, and includes the first surface resin layer 11a made of polyethylene terephthalate or polypropylene. When the seal-type thermal transfer image-receiving sheet 100 is cut by the cutter inside a printer, a pressure-sensitive adhesive constituting the pressure-adhesive layer 51 can be prevented from adhering to the cutter, leading to prevention of cutting failure, by the fact that the surface resin layer 11 includes the first surface resin layer 11a made of polyethylene terephthalate or polypropylene. To the polyethylene terephthalate or polypropylene constituting the first surface resin layer 11a, additives may be added as appropriate depending on actions or functions desired.

Here, the surface resin layer 11 may have a layered structure in which the first surface resin layer 11a made of polyethylene terephthalate or polypropylene, the second surface resin layer 11b, as shown in FIG. 1, and additionally, a third, a fourth . . . surface resin layers, not shown, are sequentially layered. Meanwhile, the surface resin layer 11 may be composed only of the first surface resin layer 11a made of polyethylene terephthalate or polypropylene.

When the surface resin layer 11 has a layered structure, there is no particular limitation with respect to the order of layering for the first surface resin layer 11a made of polyethylene terephthalate or polypropylene, the second surface resin layer 11b, and the like. As shown in FIG. 1, the first surface resin layer 11a made of polyethylene terephthalate or polypropylene is preferably located on the seal portion 50 side, more specifically, on the surface on the pressure-adhesive layer 51 side in the seal portion 50. It is possible to more effectively prevent a pressure-sensitive adhesive constituting the pressure-adhesive layer 51 from adhering to the cutter by locating the first surface resin layer 11a on the surface on the pressure-adhesive layer 51 side. It is also possible to further effectively prevent a pressure-sensitive adhesive constituting the pressure-adhesive layer 51 from adhering to the cutter by using polypropylene as the material for the first surface resin layer 11a.

Meanwhile, whether the surface resin layer 11 has a single-layer structure composed only of the first surface resin layer 11a or has a layered structure composed of the first surface resin layer 11a, the second surface resin layer 11b, and the like, it is possible to further prevent printing unevenness by using polyethylene terephthalate as the material for the first surface resin layer 11a.

When the surface resin layer 11 has a layered structure, there is no particular limitation with respect to the material for the second surface resin layer 11b, and for example, polyethylene and the like can be used. When the third, the fourth . . . surface resin layers are included in addition to the second surface resin layer 11b, additives may be added as appropriate depending on actions or functions desired to the resins constituting these layers.

As described above, from the viewpoint of preventing printing unevenness, polyethylene terephthalate is preferably used as the material for the surface resin layer 11. From the viewpoint of the ease of cutting, that is, cutting suitability in cutting the seal-type thermal transfer image-receiving sheet 100 by scissors, polyethylene, which is softer than polyethylene terephthalate, is preferably used as the material for the surface resin layer 11. Accordingly, from the viewpoint of both prevention of printing unevenness and cutting suitability, it is preferable that surface resin layer 11 have a layered structure, polyethylene terephthalate be used as the first surface resin layer 11a, and polyethylene be used as the second surface resin layer 11b.

Either when the surface resin layer 11 has a single-layer structure only of the first surface resin layer 11a made of polyethylene terephthalate or polypropylene or when the surface resin layer 11 has a layered structure in which the first surface resin layer 11a made of polyethylene terephthalate or polypropylene and the second surface resin layer 11b are layered, the thickness of the surface resin layer 11 $t_2$ can be appropriately designed in consideration that the relationship between the thickness of the back face resin layer 13 $t_3$ and the thickness of the seal portion substrate 52 $t_1$ constituting the seal portion 50 satisfies $(t_1+t_2)/t_3 \geq 4$.

For example, when the thickness of the seal portion substrate 52 $t_1$ is 75 μm, the thickness of the surface resin layer 11 $t_2$ is preferably 39 μm or more and 64 μm or less. Then, when the thickness of the surface resin layer 11 $t_2$ is 39 μm or more and 64 μm or less and the surface resin layer 11 has a layered structure in which the first surface resin layer 11a made of polyethylene terephthalate or polypropylene and the second surface resin layer 11b are layered, the thickness of the first surface resin layer 11a is preferably 50 μm or less, particularly preferably 38 μm or less.

Here, the above explanation is made on the premise that the surface resin layer 11 constituting the release portion 10 of the seal-type thermal transfer image-receiving sheet 100 according to the present embodiment is located on the surface of the release portion paper substrate 12 on the seal portion 50 side as shown in FIG. 1 and includes the first surface resin layer 11a made of polyethylene terephthalate or polypropylene, but such an aspect is not necessarily needed. The surface resin layer 11 constituting the release portion 10 of the seal-type thermal transfer image-receiving sheet 100 may not include a layer made of polyethylene terephthalate or polypropylene. However, even when the surface resin layer 11 includes no layer made of polyethylene terephthalate or polypropylene, in the seal-type thermal transfer image-receiving sheet 100 according to the present embodiment, the total thickness of all the layers made of polyethylene terephthalate included in the seal portion substrate 52 and the surface resin layer 11 is required to be 50 μm or more. Thus, in this case, it is necessary for the seal portion substrate 52 to include a layer made of polyethylene terephthalate having a thickness of 50 μm or more.

From the viewpoint of preventing printing unevenness, the total thickness of the layers made of polyethylene terephthalate in the seal portion substrate 52 and the surface resin layer 11 is 50 μm or more, and the proportion of the total thickness of the layers made of polyethylene terephthalate in the seal portion substrate 52 and the surface resin layer 11 based on the sum $(t_1+t_2)$ of the thickness of the seal portion substrate 52 $t_1$ and the thickness of the surface resin layer 11 $t_2$ is preferably 60% or more, more preferably 70% or more, particularly preferably 87% or more.

Back Face Resin Layer of Release Portion

The back face resin layer 13 constituting the release portion 10 of the seal-type thermal transfer image-receiving sheet 100 according to the present embodiment is located on the surface of the release portion paper substrate 12 opposite to the seal portion 50 side, as shown in FIG. 1. There is no particular limitation with respect to the material for back face resin layer 13. For example, various polyolefins can be used as in the second surface resin layer 11b constituting the surface resin layer 11, and more specifically, for example, polyethylene and the like can be used. In the same manner as for the surface resin layer 11, additives may be added as appropriate to the resin constituting the back face resin layer 13 depending on actions and functions desired.

The thickness of the back face resin layer 13 $t_3$ is 20 μm or more from the viewpoint of the conveyance of the seal-type thermal transfer image-receiving sheet 100 according to the present embodiment in a printer, and can be appropriately designed in consideration that the relationship between the thickness of the seal portion substrate 52 $t_1$ and the thickness of the surface resin layer 11 $t_2$ satisfies $(t_1+t_2)/t_3 \geq 4$.

Other Layers of Release Portion

The release portion 10 of the seal-type thermal transfer image-receiving sheet 100 according to the present embodiment includes the surface resin layer 11, the release portion paper substrate 12, and the back face resin layer 13 as essential constituents, as described above, but other layers than these may be layered therein.

For example, as shown in FIG. 1, the back face layer 14 may be layered under the back face resin layer 13. The conveyance can be further improved by providing the back face layer 14 under the back face resin layer 13. There is not particular limitation with respect to the material for such a back face layer 14, and, it is possible to use, for example, a resin, such as an acrylic resin, a cellulose resin, polycarbonate, polyvinyl acetal, polyvinyl alcohol, polyamide, polystyrene, polyester, or a halogenated polymer, to which an organic filler, such as a nylon filler, an acrylic filler, an polyamide filler, a fluorine type filler, polyethylene wax, or amino acid type powder or an inorganic filler such as silicon dioxide or an metal oxide is added as an additive. Cured products obtained by curing these resins with a curing agent such as an isocyanate compound or chelate compound can be used. The thickness of the back face layer is generally about 0.1 μm or more and about 5 μm or less.

Although not shown in FIG. 1, a primer layer to improve adhesion or various functional layers may be provided between every two of the surface resin layer 11, the release portion paper substrate 12, the back face resin layer 13, and the back face layer 14. Specifically, for example, a back face primer layer (not shown) may be provided between the back face resin layer 13 and the back face layer 14. There is also no particular limitation with respect to the material for the back face primer layer, and examples thereof can include polyester, polyacrylic esters, polyurethane, styrene acrylate, polyacrylamide, polyamide, polyether, polystyrene, polyethylene, polypropylene, vinyl resins such as polyvinyl chloride and polyvinyl acetate, polyvinyl alcohol, and polyvinyl pyrrolidone, polyvinyl acetals such as polyvinyl acetoacetal and polyvinyl butyral, and inorganic particles. There is also no particular limitation with respect to the thickness thereof, and the thickness is preferably 0.8 µm or more, more preferably 1 µm or more. The upper limit is not particularly limited, but it is necessary to design the upper limit in consideration of the total thickness of the seal-type thermal transfer image-receiving sheet 100. The upper limit is about 2.5 µm, for example.

A release layer (not shown) may also be provided on the upper side of the surface resin layer 11. It is possible to make the seal portion 50 easily peelable from the release portion 10 by providing a release layer. There is also no particular limitation with respect to the material and the thickness of the release layer, and conventionally known various materials and thicknesses can be selected appropriately and used.

Next, the respective layers constituting the seal portion 50 of the seal-type thermal transfer image-receiving sheet 100 according to the present embodiment will be explained.

Pressure-Adhesive Layer of Seal Portion

There is no particular limitation with respect to components of the pressure-adhesive layer 51 constituting the seal portion 50 of the seal-type thermal transfer image-receiving sheet 100 according to the present embodiment, and common components can be selected appropriately and used. Specific examples thereof can include acrylic resins, vinyl resins, polyesters, polyurethane, polyamide, epoxy resins, rubber resins, and ionomer resins.

There is also no particular limitation with respect to the thickness of the pressure-adhesive layer 51, and the thickness is generally in the range of 5 µm or more and 20 µm or less, preferably in the range of 8 µm or more and 10 µm or less.

A release layer may be provided instead of the pressure-adhesive layer 51 of the seal portion. As the release layer in this case, the release layer provided on the upper side of the surface resin layer 11 of the release portion mentioned above can be selected appropriately and used. When a release layer is provided in the seal portion, the pressure-adhesive layer may be provided on the release portion side, specifically on the upper side of the surface resin layer 11 of the release portion.

Seal Portion Substrate of Seal Portion

There is no particular limitation with respect to the material for the seal portion substrate 52 constituting the seal portion 50 of the seal-type thermal transfer image-receiving sheet 100 according to the present embodiment. Specifically, examples thereof can include substrates (films may be acceptable) of stretched or unstretched plastics including polyesters such as polyethylene terephthalate and polyethylene naphthalate, polypropylene, polycarbonate, cellulose acetate, polyethylene derivatives, polyamide, and polymethylpentene. The seal portion substrate 52 may be of a single-layer structure or may be of a composite substrate in which two or more layers are layered. When the seal portion substrate 52 is of a composite substrate, optional layers other than those described above may be included among layers constituting the composite substrate.

As the seal portion substrate 52, a resin substrate (a film may be acceptable) having voids can also be used. The resin substrate having voids serves as a heat insulation layer. It is possible to form an image having a high density on the receiving layer 53 by using a resin substrate (film) having voids between the pressure-adhesive layer 51 and the receiving layer 53. Examples of the resin substrate having voids therein can include polyesters having high heat resistance such as polyethylene terephthalate and polyethylene naphthalate, polyethylene, polypropylene, polybutene, polyisobutene, polyisobutylene, polybutadiene, polyisoprene, and ethylene-vinyl acetate copolymers. Use of such a resin substrate having voids therein as the seal portion substrate 52 is preferable because it is possible to conceal the formation of a transfer receiving article when the resin substrate is transferred onto the transfer receiving article.

The resin substrate having voids therein can be obtained by two methods described below, for example. One is a method in which inorganic particles are kneaded into a polymer, and the compound is stretched to generate microvoids by using the inorganic particles as cores. The other is a method including preparing a compound in which an incompatible polymer(s) (one or several thereof may be acceptable) is blended in a base resin. When this compound is observed microscopically, polymer units are mutually forming a fine sea-island structure. Stretching this compound leads to delamination of the sea-island interface or deformation of polymer units forming the islands to thereby generate voids.

The thickness of such a seal portion substrate 52 $t_1$ can be appropriately designed in consideration that the relationship between the thickness of the surface resin layer 11 $t_2$ and the thickness of the back face resin layer 13 $t_3$ satisfies $(t_1+t_2)/t_3 \geq 4$. For example, the thickness $t_1$ may be in the range of 50 µm or more and 100 µm or less.

In the seal-type thermal transfer image-receiving sheet 100 according to the present embodiment, it is required that either or both of the seal portion substrate 52 and the surface resin layer 11 include a layer made of polyethylene terephthalate and the total thickness of all the layers made of polyethylene terephthalate included in the seal portion substrate 52 and the surface resin layer 11 be 50 µm or more. Thus, it is necessary to design the material, constituents, and thickness of the seal portion substrate 52 so as to satisfy this.

Receiving Layer of Seal Portion

There is no particular limitation with respect to the components of the receiving layer 53 constituting the seal portion 50 of the seal-type thermal transfer image-receiving sheet 100 according to the present embodiment. Examples thereof can include polyolefins such as polypropylene, halogenated resins such as polyvinyl chloride or polyvinylidene chloride, vinyl resins such as polyvinyl acetate, vinyl chloride-vinyl acetate copolymers, ethylene-vinyl acetate copolymers, or vinyl resins such as polyacrylic esters, polyesters such as polyethylene terephthalate or polybutylene terephthalate, polystyrene, polyamide-type resin, copolymers of an olefin such as ethylene or propylene and another vinyl polymer, ionomers or cellulose resins such as cellulose diacetate, polycarbonate, and solvent-type resins such as acrylic resins. These materials may be used singly or in combinations of two or more thereof.

There is no particular limitation with respect to the thickness of the receiving layer 53, and the thickness is preferably in the range of 0.5 µm or more and 10 µm or less, more preferably in the range of 2 m or more and 5 µm or less.

Other Layers of Seal Portion

The seal portion 50 of the seal-type thermal transfer image-receiving sheet 100 according to the present embodiment includes the pressure-adhesive layer 51, the seal portion substrate 52, and the receiving layer 53 as essential constituents, as described above, but other layers than these may be layered therein.

For example, an adhesive layer 54 may be provided between the seal portion substrate 52 and the receiving layer 53, as shown in FIG. 1. It is possible to improve the adhesion between the seal portion substrate 52 and the receiving layer 53 by providing the adhesive layer 54 therebetween. There is no particular limitation with respect to the material for such an adhesive layer 54, and examples thereof can include polyesters, polyacrylic esters, polyurethane, polystyrene acrylate, polyacrylamide, polyamide, polyether, polystyrene, polyolefins such as polyethylene and polypropylene, vinyl resins such as polyvinyl acetate and polyvinyl chloride, polyvinyl alcohol, and polyvinyl pyrrolidone, polyvinyl acetals such as polyvinyl acetoacetal and polyvinyl butyral, and inorganic particles. There is also no particular limitation with respect to the thickness thereof, and the thickness is preferably 0.8 μm or more, more preferably 1 μm or more. The upper limit is not particularly limited, but it is necessary to design the upper limit in consideration of the total thickness of the seal-type thermal transfer image-receiving sheet 100. The upper limit is about 2.5 μm, for example.

The resins constituting each layer are exemplarily described herein. These resins may be homopolymers of a monomer constituting each resin, or may be copolymers of a monomer as the main component constituting each resin and one or more other monomers or derivatives thereof. For example, in the case of the reference to an acrylic resin, the resin is only required to contain an acrylic acid or methacrylic acid monomer or an acrylate or methacrylate monomer as the main component. The resin may also be a modified product of these resins. Alternatively, other resins than those exemplified herein may be used.

EXAMPLES

Next, the seal-type thermal transfer image-receiving sheet according to the present embodiment will be described more concretely with reference to examples and comparative examples. Hereinbelow, unless otherwise specified, the expression of part(s) means that by mass, being a value not in terms of solid content.

Example 1

A first polyethylene having a density of 0.956 g/cm$^3$ (NOVATEC® HD HS471, Japan Polyethylene Corporation) and a second polyethylene having a density of 0.918 g/cm$^3$ (NOVATEC® LD LC600A, Japan Polyethylene Corporation) were provided and mixed such that the mass proportion of the first polyethylene was 80% based on the total mass of the first polyethylene and the second polyethylene. The mixture was extrusion molding (EC)-processed onto one surface of a release portion paper substrate (Pearl Coat 84.8, Mitsubishi Paper Mills Limited, thickness: 68 μm) to form a back face resin layer having an average density of 0.9484 g/cm$^3$ and a thickness of 25 μm.

In addition, the second polyethylene was provided separately and extrusion molding (EC)-processed onto the other surface of the release portion paper substrate to form a second surface resin layer having a thickness of 14 μm. A PET film (Lumirror® T60, Toray Industries, Inc., thickness: 25 μm) was layered as a first surface resin layer on this second surface resin layer to form a surface resin layer having a layered structure.

Then, a coating liquid for release layer having the following composition was coated onto the surface resin layer so as to obtain a thickness of 0.25 μm in the dried state and the coated liquid was dried to form a release layer.

In the manner described above, a release portion in which the release layer, the surface resin layer, the release portion paper substrate, and the back face resin layer were layered in this order was obtained.

Meanwhile, a 75 m-thick PET film having microvoids (FK202, TOYOBO CO., LTD.) was used as a seal portion substrate. A coating liquid for adhesive layer having the following composition was coated onto one surface of this seal portion substrate so as to obtain a thickness of 1.5 μm in the dried state and the coated liquid was dried to form an adhesive layer.

Then, a coating liquid for receiving layer having the following composition was coated onto this adhesive layer so as to obtain a thickness of 4.5 μm in the dried state and the coated liquid was dried to form a receiving layer.

Then, a coating liquid for pressure-adhesive layer having the following composition was coated onto the other surface of the seal portion substrate so as to obtain a thickness of 9 μm in the dried state and the coated liquid was dried to form a pressure-adhesive layer.

In the manner described above, a seal portion in which the receiving layer, the adhesive layer, the seal portion substrate, and the pressure-adhesive layer were layered in this order was obtained.

The release portion and the seal portion were bonded to each other such that the release layer of the release portion was opposed to the pressure-adhesive layer of the seal portion to thereby obtain a seal-type thermal transfer image-receiving sheet of Example 1, in which the release portion and the seal portion were integrated.

(Coating Liquid for Release Layer)

| | |
|---|---|
| Addition polymerization agent silicone (KS847H, Shin-Etsu Chemical Co., Ltd.) | 100 parts |
| Toluene | 200 parts |

(Coating Liquid for Adhesive Layer)

| | |
|---|---|
| Polyurethane (Nipolon (R) 5199, TOSOH CORPORATION) | 14 parts |
| Titanium oxide (TCA-888, Sakai Chemical Industry Co., Ltd.) | 28 parts |
| Toluene | 13 parts |
| Methyl ethyl ketone | 34 parts |
| Isopropyl alcohol | 11 parts |

(Coating Liquid for Receiving Layer)

| | |
|---|---|
| Vinyl chloride-vinyl acetate copolymer (SOLBIN (R) C, Nissin Chemical Industry Co., Ltd.) | 12 parts |
| Epoxy-modified silicone (X-22-3000T, Shin-Etsu Chemical Co., Ltd.) | 0.8 parts |
| Amino-modified silicone (X-22-1660B-3, Shin-Etsu Chemical Co., Ltd.) | 0.24 parts |
| Toluene | 30 parts |
| Methyl ethyl ketone | 30 parts |

(Coated Liquid for Pressure-Adhesive Layer)

| | |
|---|---|
| Acryl copolymer (SK-Dyne 1251, Soken Chemical & Engineering Co., Ltd.) | 15 parts |
| Curing agent (L-45, Soken Chemical & Engineering Co., Ltd.) | 0.33 parts |
| Curing agent (E-AX, Soken Chemical & Engineering Co., Ltd.) | 0.1 parts |
| Ethyl acetate | 16.14 parts |

Example 2

A seal-type thermal transfer image-receiving sheet of Example 2 was obtained exactly in the same manner as in Example 1 except that a coating liquid for back face primer layer and a coating liquid for back face layer each having the following composition were coated onto on the surface of the back face resin layer of the release portion, on the side not in contact with the release portion paper substrate, in Example 1, so as to obtain a total thickness of 1.0 µm in the dried state and the coated liquids were dried to form a back face primer layer and a back face layer.
(Coating Liquid for Back Face Primer Layer)

| | |
|---|---|
| Polyurethane (OPT primer, SHOWA INK MANUFACTURING CO., LTD) | 100 parts |
| Isocyanate type curing agent (OPT curing agent, SHOWA INK MANUFACTURING CO., LTD) | 5 parts |

(Coating Liquid for Back Face Layer)

| | |
|---|---|
| Polyvinyl butyral (S-LEC (R) B BL-7, Sekisui Chemical Co., Ltd.) | 10 parts |
| Silicon dioxide (Sylysia 380, Fuji Silysia Chemical Ltd.) | 0.75 parts |
| Titanium chelate (AT chelating agent, DENKAPOLYMER KABUSHIKI KAISHA) | 0.117 parts |

Example 3

A seal-type thermal transfer image-receiving sheet of Example 3 was obtained exactly in the same manner as in Example 1 except that the surface resin layer of the release portion in Example 1 included only the first surface resin layer.

Example 4

A seal-type thermal transfer image-receiving sheet of Example 4 was obtained exactly in the same manner as in Example 1 except that the surface resin layer of the release portion in Example 1 included only the first surface resin layer and a PET film (Lumirror® T60, Toray Industries, Inc., thickness: 39 µm) was used as this first surface resin layer.

Example 5

A seal-type thermal transfer image-receiving sheet of Example 5 was obtained exactly in the same manner as in Example 1 except that the surface resin layer of the release portion in Example 1 included only the first surface resin layer and a PET film (Lumirror® T60, Toray Industries, Inc., thickness: 50 µm) was used as this first surface resin layer.

Example 6

A seal-type thermal transfer image-receiving sheet of Example 6 was obtained exactly in the same manner as in Example 1 except that a PET film (Lumirror® 12F65K, Toray Industries, Inc., thickness: 12 µm) was used as the first surface resin layer in the surface resin layer of the release portion in Example 1 and the thickness of the second surface resin layer was set to 24 µm.

Example 7

A seal-type thermal transfer image-receiving sheet of Example 7 was obtained exactly in the same manner as in Example 1 except that a PET film (Lumirror® 12F65K, Toray Industries, Inc., thickness: 12 µm) was used as the first surface resin layer in the surface resin layer of the release portion in Example 1.

Example 8

A seal-type thermal transfer image-receiving sheet of Example 8 was obtained exactly in the same manner as in Example 1 except that a PET film (Lumirror® T60, Toray Industries, Inc., thickness: 38 µm) was used as the first surface resin layer in the surface resin layer of the release portion in Example 1.

Example 9

A seal-type thermal transfer image-receiving sheet of Example 9 was obtained exactly in the same manner as in Example 1 except that a biaxially oriented PP film (FOS-BT, Futamura Chemical Co., Ltd., thickness: 30 µm) was used as the first surface resin layer in the surface resin layer of the release portion in Example 1.

Example 10

A seal-type thermal transfer image-receiving sheet of Example 10 was obtained exactly in the same manner as in Example 1 except that a PET film (K203E6F, Toray Industries, Inc., thickness: 5.5 µm) was used as the first surface resin layer in the surface resin layer of the release portion in Example 1 and the thickness of the second surface resin layer was set to 33 µm.

Example 11

A seal-type thermal transfer image-receiving sheet of Example 11 was obtained exactly in the same manner as in Example 1 except that a PET film (Lumirror® 12F65K, Toray Industries, Inc., thickness: 12 µm) was used as the first surface resin layer in the surface resin layer of the release portion in Example 1 and the thickness of the second surface resin layer was set to 29 µm.

Example 12

A seal-type thermal transfer image-receiving sheet of Example 12 was obtained exactly in the same manner as in Example 1 except that a PET film (Lumirror® T60, Toray Industries, Inc., thickness: 50 µm) was used as the first surface resin layer in the surface resin layer of the release portion in Example 1.

Example 13

A seal-type thermal transfer image-receiving sheet of Example 13 was obtained exactly in the same manner as in Example 1 except that the thickness of the back face resin layer of the release portion in Example 1 was set to 20 μm.

Example 14

A seal-type thermal transfer image-receiving sheet of Example 14 was obtained exactly in the same manner as in Example 1 except that the thickness of the seal portion substrate of the seal portion in Example 1 was set to 50 μm, a PET film (Lumirror® T60, Toray Industries, Inc., thickness 50: μm) was used as the first surface resin layer of the release portion, the thickness of the second resin layer was set to 20 μm, and the thickness of the back face resin layer was set to 30 μm.

Example 15

A seal-type thermal transfer image-receiving sheet of Example 15 was obtained exactly in the same manner as in Example 1 except that the thickness of the seal portion substrate of the seal portion in Example 1 was set to 100 μm.

Example 16

A seal-type thermal transfer image-receiving sheet of Example 16 was obtained exactly in the same manner as in Example 1 except that the surface resin layer of the release portion in Example 1 included only the second surface resin layer and a polypropylene having a density of 0.9 g/cm³ (NOVATEC PP® MA3) was used as this second surface resin layer, whose thickness was set to 30 μm.

Example 17

A seal-type thermal transfer image-receiving sheet of Example 17 was obtained exactly in the same manner as in Example 1 except that the surface resin layer of the release portion in Example 1 included only the second surface resin layer and the thickness of this second surface resin layer was set to 33 μm.

Example 18

A seal-type thermal transfer image-receiving sheet of Example 18 was obtained exactly in the same manner as in Example 1 except that the thickness of the seal portion substrate of the seal portion in Example 1 was set to 100 μm, the surface resin layer of the release portion included only the second surface resin layer, and a polypropylene having a density of 0.9 g/cm³ (NOVATEC PP® MA3) was used as this second surface resin layer, whose thickness was set to 30 μm.

Example 19

A seal-type thermal transfer image-receiving sheet of Example 19 was obtained exactly in the same manner as in Example 1 except that the thickness of the seal portion substrate of the seal portion in Example 1 was set to 100 μm, the surface resin layer of the release portion included only the second surface resin layer, and the thickness of this second surface resin layer was set to 33 μm.

Example 20

A seal-type thermal transfer image-receiving sheet of Example 20 was obtained exactly in the same manner as in Example 1 except that the coating liquid for pressure-adhesive layer was coated instead of the release layer onto the position where the release layer of the release portion in Example 1 was provided so as to obtain a thickness of 9 μm in the dried state and the coated liquid was dried to form a pressure-adhesive layer, and meanwhile, the coating liquid for release layer was applied instead of the pressure-adhesive layer onto the position where the pressure-adhesive layer of the seal portion is provided in Example 1 so as to obtain a thickness of 0.25 μm in the dried state and the coated liquid was dried to form a release layer.

Comparative Example 1

A seal-type thermal transfer image-receiving sheet of Comparative Example 1 was obtained exactly in the same manner as in Example 1 except that a PET film (Lumirror® T60, Toray Industries, Inc., thickness: 75 μm) was used as the first surface resin layer in the surface resin layer of the release portion in Example 1.

Comparative Example 2

A seal-type thermal transfer image-receiving sheet of Comparative Example 2 was obtained exactly in the same manner as in Example 1 except that coated paper (Pearl Coat 127.9, Mitsubishi Paper Mills Limited, thickness: 100 μm) was used as the release portion paper substrate of the release portion in Example 1.

Comparative Example 3

A seal-type thermal transfer image-receiving sheet of Comparative Example 3 was obtained exactly in the same manner as in Example 1 except that the thickness of the back face resin layer of the release portion in Example 1 was set to 15 μm.

Comparative Example 4

A seal-type thermal transfer image-receiving sheet of Comparative Example 4 was obtained exactly in the same manner as in Example 1 except that a PET film (K203E6F, Toray Industries, Inc., thickness: 5.5 μm) was used as the first surface resin layer in the surface resin layer of the release portion in Example 1.

Comparative Example 5

A seal-type thermal transfer image-receiving sheet of Comparative Example 5 was obtained exactly in the same manner as in Example 1 except that the surface resin layer of the release portion in Example 1 included only the second surface resin layer.

Comparative Example 6

A seal-type thermal transfer image-receiving sheet of Comparative Example 6 was obtained exactly in the same manner as in Example 1 except that no back face resin layer of the release portion in Example 1 was formed.

Comparative Example 7

A seal-type thermal transfer image-receiving sheet of Comparative Example 7 was obtained exactly in the same manner as in Example 1 except that a porous polyolefin film (SP-M, Mitsui Chemicals Tohcello, Inc., thickness: 40 μm) was used as the seal portion substrate of the seal portion in Example 1, no surface resin layer of the release portion was formed, coated paper (Pearl Coat 157, Mitsubishi Paper Mills Limited, thickness: 128 μm) was used as the release portion paper substrate, and further, the thickness of the back face resin layer was set to 30 μm.

Comparative Example 8

A seal-type thermal transfer image-receiving sheet of Comparative Example 8 was obtained exactly in the same manner as in Example 1 except that a PET film (35EDOS, Toray Industries, Inc., thickness 35 μm) was used as the seal portion substrate of the seal portion in Example 1.

Comparative Example 9

A seal-type thermal transfer image-receiving sheet of Comparative Example 9 was obtained exactly in the same manner as in Example 1 except that a PET film (35EDOS, Toray Industries, Inc., thickness: 35 μm) was used as the seal portion substrate of the seal portion in Example 1 and no surface resin layer of the release portion was formed.

Comparative Example 10

A seal-type thermal transfer image-receiving sheet of Comparative Example 10 was obtained exactly in the same manner as in Example 1 except that a PET film (35EDOS, Toray Industries, Inc., thickness: 40 μm) was used as the seal portion substrate of the seal portion in Example 1, a biaxially oriented PP film (FOS-BT, Futamura Chemical Co., Ltd., thickness: 30 μm) was used as the first surface resin layer in the surface resin layer of the release portion, and the thickness of the second surface resin layer was set to 33 μm.

Comparative Example 11

A seal-type thermal transfer image-receiving sheet of Comparative Example 11 was obtained exactly in the same manner as in Example 1 except that a PET film (35EDOS, Toray Industries, Inc., thickness: 40 μm) was used as the seal portion substrate of the seal portion in Example 1, a biaxially oriented PP film (FOS-BT, Futamura Chemical Co., Ltd., thickness: 60 μm) was used as the first surface resin layer in the surface resin layer of the release portion, and the thickness of the second surface resin layer was set to 33 μm.

(Curl Evaluation)

The seal-type thermal transfer image-receiving sheet of each of Examples and Comparative Examples was combined with a sublimation type thermal transfer printer DS620 (Dai Nippon Printing Co., Ltd.) and a genuine thermal transfer sheet for the printer, and a gray uniform image (128/255 gradation image) was printed on each sheet. Each seal-type thermal transfer image-receiving sheet after printing was mounted such that the printed surface (receiving layer) faced downward, the height at each of the four corners thereof was measured, and curl evaluation was conducted under the following evaluation criteria. The seal-type thermal transfer image-receiving sheet of each of Examples and Comparative Examples was in a roll form having a width of 6 inches. Samples obtained by cutting each sheet so as to have a length of 8 inches after printing were used for the curl evaluation. The uniform image refers to an image in which all the pixels have the same gradation.

Evaluation Criteria for Curl Evaluation
- A: The maximum value of the height of the four corners is less than 30 mm.
- B: The maximum value of the height of the four corners is 30 mm or more and less than 40 mm.
- NG: The maximum value of the height of the four corners is 40 mm or more.

(Conveyance Evaluation)

The seal-type thermal transfer image-receiving sheet of each of Examples and Comparative Examples was combined with a sublimation type thermal transfer printer DS620 (Dai Nippon Printing Co., Ltd.) and a genuine thermal transfer sheet for the printer, and printing was made on 50 sheets. Whether a registration shift occurred in the prints was checked by visual observation, and conveyance evaluation was conducted under the following evaluation criteria. The registration shift is a shift of the printing position due to insufficient conveyance, meaning a state in which the image-receiving sheet after printing of the Y panel and M panel is not conveyed to the normal position, a shift has occurred in the image, and the printing quality is markedly degraded. No occurrence of a registration shift means that conveyance is satisfactory.

Evaluation Criteria for Conveyance Evaluation
- A: No registration shift has occurred in the print.
- B: An extremely slight registration shift has occurred, but not causing any inconvenience for the print.
- NG: A registration shift has occurred in the print.

(Cutting Suitability Evaluation)

The seal-type thermal transfer image-receiving sheet of each of Examples and Comparative Examples was cut with scissors, and cutting suitability evaluation was conducted under the following evaluation criteria.

Evaluation Criteria for Cutting Suitability
- A: It was possible to cut the sheet straight without resistance.
- B: Although there was extremely slight resistance, it was possible to cut the sheet straight without problems.
- C: Although there was some resistance, it was possible to cut the sheet straight without problems.
- NG: There was slight resistance, and it was not possible to cut the sheet straight.

(Pressure-Sensitive Adhesive Adherence Evaluation)

The seal-type thermal transfer image-receiving sheet of each of Examples and Comparative Examples was combined with a sublimation type thermal transfer printer DS620 (Dai Nippon Printing Co., Ltd.) and a genuine thermal transfer sheet for the printer, and printing was made on 2000 sheets. Pressure-sensitive adhesive adherence evaluation was conducted under the following evaluation criteria.

Evaluation Criteria for Pressure-Sensitive Adhesive Adherence Evaluation
- A: The pressure-sensitive adhesive does not adhere to the paper guide under of the printer, and the level is such that 2000 sheets can be normally printed.
- B: The pressure-sensitive adhesive adheres to the paper guide under of the printer, but is at the level is such that 2000 sheets can be normally printed.
- NG: The pressure-sensitive adhesive adheres in a large amount to the paper guide under of the printer, and the level is such that a malfunction of the printer occurs before printing on 2000 sheets is completed.

(Printing Unevenness Evaluation)

The seal-type thermal transfer image-receiving sheet of each of Examples and Comparative Examples was combined with a sublimation type thermal transfer printer DS620 (Dai Nippon Printing Co., Ltd.) and a genuine thermal transfer sheet for the printer, and a gray uniform image (128/255 gradation image) was printed on each sheet. Printing unevenness (density unevenness) evaluation was conducted on the printed gray uniform images by visual observation under the following evaluation criteria.

Evaluation Criteria for Printing Unevenness Evaluation
- A: There was no density unevenness, and the texture was excellent.
- B: Density unevenness was present but was inconspicuous and acceptable.
- NG: Density unevenness was marked, and the texture was poor.

The characteristics of the seal-type thermal transfer image-receiving sheet of each of Examples and Comparative Examples and the results of the evaluations are summarized in Tables 1 to 3. Table 1 is for Examples 1 to 10, Table 2 is for Examples 11 to 20, and Table 3 is for Comparative Examples. The values in the tables indicate the "thickness" of each layer or each substrate, all expressed in "µm".

TABLE 1

| | | | Example |||||||||||
|---|---|---|---|---|---|---|---|---|---|---|---|---|
| | | | 1 | 2 | 3 | 4 | 5 | 6 | 7 | 8 | 9 | 10 |
| Seal portion | Receiving layer | | 4.5 | 4.5 | 4.5 | 4.5 | 4.5 | 4.5 | 4.5 | 4.5 | 4.5 | 4.5 |
| | Adhesive layer | | 1.5 | 1.5 | 1.6 | 1.5 | 1.5 | 1.5 | 1.5 | 1.5 | 1.5 | 1.5 |
| | Seal portion substrate ($t_1$) | | 75 | 75 | 75 | 75 | 75 | 75 | 75 | 75 | 75 | 75 |
| | Pressure-adhesive layer | | 9.0 | 9.0 | 9.0 | 9.0 | 9.0 | 9.0 | 9.0 | 9.0 | 9.0 | 9.0 |
| Release portion | Release layer | | 0.25 | 0.25 | 0.25 | 0.25 | 0.25 | 0.25 | 0.25 | 0.25 | 0.25 | 0.25 |
| | Surface resin layer ($t_2$) | First | PET 25 | PET 25 | PET 25 | PET 39 | PET 50 | PET 12 | PET 12 | PET 38 | PP 30 | PET 5.5 |
| | | Second | PE 14 | PE 14 | | | | PE 24 | PE 14 | PE 14 | PE 14 | PE 33 |
| | Release portion paper substrate | | 68 | 68 | 68 | 68 | 68 | 68 | 68 | 68 | 68 | 68 |
| | Back face resin layer ($t_3$) | | 25 | 25 | 25 | 25 | 25 | 25 | 25 | 25 | 25 | 25 |
| | Back face primer layer/back face layer | | | 1.0 | | | | | | | | |
| | Total thickness | | 222.25 | 223.26 | 208.25 | 222.25 | 233.25 | 219.25 | 209.25 | 235.25 | 227.25 | 221.25 |
| | ($t_1 + t_2$)/($t_3$) | | 4.56 | 4.56 | 4 | 4.56 | 5 | 4.44 | 4.04 | 5.08 | 4.76 | 4.54 |
| | Total PET thickness in surface resin layer and seal portion substrate | | 100 | 100 | 100 | 114 | 126 | 87 | 87 | 113 | 75 | 80.5 |
| | Curl evaluation | | ○ | ○ | ○ | ○ | ○ | ○ | ○ | ○ | ○ | ○ |
| | Conveyance evaluation | | B | A | B | B | B | B | B | B | B | B |
| | Cutting suitability evaluation | | A | A | A | A | A | A | A | B | A | A |
| | Pressure-sensitive adhesive adherence evaluation | | B | B | B | B | B | B | B | B | A | B |
| | Printing unevenness evaluation | | A | A | A | A | A | B | B | A | B | B |

TABLE 2

| | | | Example |||||||||||
|---|---|---|---|---|---|---|---|---|---|---|---|---|
| | | | 11 | 12 | 13 | 14 | 15 | 16 | 17 | 18 | 19 | 20 |
| Seal portion | Receiving layer | | 4.5 | 4.5 | 4.5 | 4.5 | 4.5 | 4.5 | 4.5 | 4.5 | 4.5 | 4.5 |
| | Adhesive layer | | 1.5 | 1.5 | 1.5 | 1.5 | 1.5 | 1.5 | 1.5 | 1.5 | 1.5 | 1.5 |
| | Seal portion substrate ($t_1$) | | 75 | 75 | 75 | 50 | 100 | 75 | 75 | 100 | 100 | 75 |
| | Pressure-adhesive layer | | 9.0 | 9.0 | 9.0 | 9.0 | 9.0 | 9.0 | 9.0 | 9.0 | 9.0 | Release layer 0.25 |
| Release portion | Release layer | | 0.25 | 0.25 | 0.25 | 0.25 | 0.25 | 0.25 | 0.25 | 0.25 | 0.25 | Pressure-adhesive layer 9.0 |
| | Surface resin layer ($t_2$) | First | PET 12 | PET 50 | PET 25 | PET 50 | PET 25 | | | | | PET 25 |
| | | Second | PE 29 | PE 14 | PE 14 | PE 20 | PE 14 | PP 30 | PE 33 | PP 30 | PE 33 | PE 14 |
| | Release portion paper substrate | | 68 | 68 | 68 | 68 | 68 | 68 | 68 | 68 | 68 | 68 |
| | Back face resin layer ($t_3$) | | 26 | 25 | 20 | 30 | 26 | 25 | 26 | 25 | 25 | 25 |
| | Back face primer layer/back face layer | | | | | | | | | | | |
| | Total thickness | | 224.25 | 247.25 | 217.25 | 233.25 | 247.25 | 213.25 | 216.25 | 238.25 | 241.25 | 222.25 |
| | ($t_1 + t_2$)/($t_3$) | | 4.64 | 5.56 | 5.7 | 4 | 5.56 | 4.2 | 4.32 | 5.2 | 5.32 | 4.56 |
| | Total PET thickness in surface resin layer and seal portion substrate | | 67 | 125 | 100 | 100 | 125 | 75 | 75 | 100 | 100 | 100 |

TABLE 2-continued

|  |  | Example | | | | | | | | | |
|---|---|---|---|---|---|---|---|---|---|---|---|
|  |  | 11 | 12 | 13 | 14 | 15 | 16 | 17 | 18 | 19 | 20 |
| Curl evaluation | | ○ | ○ | ○ | ○ | ○ | ○ | ○ | ○ | ○ | ○ |
| Conveyance evaluation | | B | B | B | B | B | B | B | B | B | B |
| Cutting suitability evaluation | | A | B | A | A | B | A | A | B | B | A |
| Pressure-sensitive adhesive adherence evaluation | | B | B | B | B | B | A | B | A | B | B |
| Printing unevenness evaluation | | B | A | A | A | A | B | B | A | A | A |

TABLE 3

|  |  |  | Comparative Example | | | | | | | | | | |
|---|---|---|---|---|---|---|---|---|---|---|---|---|---|
|  |  |  | 1 | 2 | 3 | 4 | 5 | 6 | 7 | 8 | 9 | 10 | 11 |
| Seal portion | | Receiving layer | 4.5 | 4.5 | 4.5 | 4.5 | 4.5 | 4.5 | 4.5 | 4.5 | 4.5 | 4.5 | 4.5 |
| | | Adhesive layer | 1.5 | 1.5 | 1.5 | 1.5 | 1.5 | 1.5 | 1.5 | 1.5 | 1.5 | 1.5 | 1.5 |
| | | Seal portion substrate ($t_1$) | 75 | 75 | 75 | 76 | 75 | 75 | 40 | 35 | 35 | 40 | 40 |
| | | Pressure-adhesive layer | 9.0 | 9.0 | 9.0 | 9.0 | 9.0 | 9.0 | 9.0 | 9.0 | 9.0 | 9.0 | 9.0 |
| Release portion | | Release layer | 0.25 | 0.25 | 0.25 | 0.25 | 0.25 | 0.25 | 0.25 | 0.25 | 0.25 | 0.26 | 0.25 |
| | Surface resin layer ($t_2$) | First | PET 75 | PET 25 | PET 25 | PET 5.5 | | PET 25 | | PET 25 | | PP 30 | PP 60 |
| | | Second | PE 14 | PE 14 | PE 14 | PE 14 | PE 14 | PE 14 | | PE 14 | PE 14 | PE 33 | PE 33 |
| | | Release portion paper substrate | 68 | 100 | 68 | 68 | 68 | 68 | 128 | 68 | 68 | 68 | 68 |
| | | Back face resin layer ($t_3$) | 25 | 25 | 16 | 26 | 25 | | 30 | 25 | 25 | 25 | 25 |
| | | Back face primer layer/back face layer | | | | | | | | | | | |
| | | Total thickness | 272.25 | 254.25 | 212.26 | 202.75 | 197.25 | 197.25 | 213.25 | 182.25 | 157.25 | 211.25 | 241.25 |
| | | ($t_1 + t_2$)/($t_3$) | 6.56 | 4.56 | 7.6 | 3.78 | 3.56 | — | 1.33 | 2.96 | 1.96 | 4.12 | 5.32 |
| | | Total PET thickness in surface resin layer and seal portion substrate | 150 | 100 | 100 | 80.5 | 75 | 100 | 40 | 60 | 36 | 40 | 40 |
| | | Curl evaluation | ○ | ○ | ○ | × | × | ○ | × | × | × | ○ | ○ |
| | | Conveyance evaluation | B | B | NG | B | B | NG | B | B | B | B | B |
| | | Cutting suitability evaluation | NG | NG | B | B | B | B | NG | B | B | A | B |
| | | Pressure-sensitive adhesive adherence evaluation | B | B | B | B | B | B | NG | B | B | A | A |
| | | Printing unevenness evaluation | A | A | A | B | B | A | NG | B | NG | NG | NG |

REFERENCE SIGNS LIST

100 Seal-type thermal transfer image-receiving sheet
10 Release portion
11 Surface resin layer
11a First surface resin layer
11b Second surface resin layer
12 Release portion paper substrate
13 Back face resin layer
50 Seal portion
51 Pressure-adhesive layer
52 Seal portion substrate
53 Receiving layer

The invention claimed is:

1. A seal-type thermal transfer image-receiving sheet comprising a seal portion provided peelably from a release portion,
wherein the seal-type thermal transfer image-receiving sheet has a total thickness of 250 μm or less,
wherein the release portion has a layered structure in which a release layer, a release portion substrate, and a receiving layer are layered in this order from the seal portion,
wherein the seal portion has a layered structure in which a pressure-adhesive layer, a surface resin layer, a seal portion paper substrate, and a back face resin layer are layered in this order from the release portion,
wherein either one or both of the release portion substrate or the surface resin layer comprise a layer made of polyethylene terephthalate,
wherein the total thickness of all the layers made of polyethylene terephthalate included in the release portion substrate and the surface resin layer is 50 μm or more,
wherein the sum of the thickness of the release portion substrate and the thickness of the surface resin layer is four times or more of the thickness of the back face resin layer, wherein the thickness of the back face resin layer is 20 μm or more, and wherein the surface resin layer comprises a first surface resin layer made of polyethylene terephthalate.

\* \* \* \* \*